United States Patent
Sainct et al.

(10) Patent No.: US 8,783,620 B2
(45) Date of Patent: Jul. 22, 2014

(54) METHOD AND SYSTEM FOR CONTROLLING A SET OF AT LEAST TWO SATELLITES ADAPTED TO PROVIDE A SERVICE

(71) Applicant: Thales, Neuilly-sur-Seine (FR)

(72) Inventors: Herve Sainct, Le Cannet (FR); Joel Amalric, Auribeau-sur-Siagne (FR); Pierre Bassaler, Mougins (FR); Xavier Roser, Cannes (FR)

(73) Assignee: Thales, Neuilly sur Seine (FR)

( * ) Notice: Subject to any disclaimer, the term of this patent is extended or adjusted under 35 U.S.C. 154(b) by 127 days.

(21) Appl. No.: 13/656,283

(22) Filed: Oct. 19, 2012

(65) Prior Publication Data

US 2013/0105632 A1    May 2, 2013

(30) Foreign Application Priority Data

Oct. 28, 2011 (FR) ...................................... 11 03290

(51) Int. Cl.
  *B64G 1/10*    (2006.01)
(52) U.S. Cl.
  USPC ...................... 244/158.6; 244/158.5; 244/169
(58) Field of Classification Search
  USPC ............. 244/158.6, 158.5, 158.8, 158.4, 169, 244/164
  See application file for complete search history.

(56) References Cited

U.S. PATENT DOCUMENTS

| | | | | |
|---|---|---|---|---|
| 5,742,254 | A * | 4/1998 | Bassaler | 343/700 MS |
| 6,082,677 | A * | 7/2000 | Kikuchi | 244/158.4 |
| 7,720,604 | B1 * | 5/2010 | Cichan et al. | 701/531 |
| 8,205,839 | B2 * | 6/2012 | Anzel et al. | 244/164 |
| 2008/0027595 | A1 * | 1/2008 | Fowler et al. | 701/13 |
| 2008/0105788 | A1 * | 5/2008 | Anzel et al. | 244/169 |
| 2008/0128559 | A1 * | 6/2008 | Ho et al. | 244/171 |
| 2008/0154502 | A1 * | 6/2008 | Tekawy et al. | 701/226 |
| 2008/0177430 | A1 * | 7/2008 | Tekawy et al. | 701/13 |
| 2008/0251645 | A1 * | 10/2008 | Li et al. | 244/158.4 |
| 2011/0144835 | A1 * | 6/2011 | Ho | 701/13 |
| 2013/0062471 | A1 * | 3/2013 | Lim et al. | 244/158.6 |

OTHER PUBLICATIONS

Xu, Guangyan et al., "Periodic and Quasi-Periodic Satellite Relative Orbits at Critical Inclination," Aerospace Conference, 2009, pp. 1-11, IEEE, IEEE, Piscataway, NJ.
Yeh, Hsi-Han et al, "Nonlinear Tracking Control for Satellite Formations," 39th IEEE Conference on Decision and Control, 2000, pp. 328- 333, IEEE, Piscataway, NJ.

* cited by examiner

*Primary Examiner* — Christopher P Ellis
*Assistant Examiner* — Medhat Badawi
(74) *Attorney, Agent, or Firm* — Baker Hostetler LLP

(57) ABSTRACT

A method is provided for controlling a set of at least two satellites adapted to provide a service used by at least one portion of the set of the said satellites at a given moment, in which, continuously or pseudo-continuously, a mean value of the longitudes of the respective ascending nodes of each satellite is computed, and, for each satellite, a correction of trajectory of the satellite is applied by regulating the longitude of the ascending node on a setpoint equal to said current mean value.

7 Claims, 2 Drawing Sheets

METHOD AND SYSTEM FOR CONTROLLING A SET OF AT LEAST TWO SATELLITES ADAPTED TO PROVIDE A SERVICE

CROSS-REFERENCE TO RELATED APPLICATION

This application claims priority to foreign French patent application No. FR 1103290, filed on Oct. 28, 2011, the disclosure of which is incorporated by reference in its entirety.

FIELD OF THE INVENTION

The present invention relates to a method for controlling a set of at least two satellites adapted to provide a service used by at least one portion of the set of the said satellites at a given moment.

The service provided by the set of satellites may, for example, be a communication or observation service.

BACKGROUND

Systems for controlling a set of satellites, often called a fleet of satellites when they are launched on one and the same orbit or on orbits sharing certain orbital parameters, are known.

An artificial satellite is an object manufactured by man, which is sent into space with the aid of a launcher and that gravitates around a planet or a natural satellite such as the moon. The velocity imposed by the rocket on the satellite allows it to keep itself practically indefinitely in space while describing an orbit around the celestial body. The latter orbit, defined as a function of the mission of the satellite, may take different shapes: heliosynchronous, geostationary, elliptical, circular, etc., and may be located at more or less high altitudes classified as low, medium, high or elliptical etc., orbit.

An artificial satellite consists of a payload, defined specifically for the mission that it must fulfil, and of a platform that is often standardised performing the support functions such as the provision of energy, propulsion, heat control, orientation maintenance and communications. The satellite is monitored by a ground control centre that sends instructions and gathers the data collected by virtue of a network of earth stations. In order to fulfil its mission, the satellite must keep itself on a reference orbit and orient its instruments precisely: work is necessary at regular intervals in order to correct the natural disruptions of the orbit that are generated, in the case of an earth satellite, by the irregularities of the gravity field, the influence of the sun and of the moon and the drag created by the atmosphere that subsists in low orbit, among others.

The duration of operation of a service provided by a set of satellites is linked to the mass of fuel that is loaded and its consumption.

A large part of the energy provided by this fuel loaded on board a satellite serves to maintain its orbit on a nominal trajectory and to orient its instruments.

One of the factors constraining the duration of a space mission is the use of resources that are loaded and are not renewable such as the fuel. This has such an impact that certain orbital solutions are practically inaccessible because of the excessive costs that they would represent in terms of fuel.

SUMMARY OF THE INVENTION

One object of the invention is notably to limit the consumption of fuel for each satellite of the set of satellites making it possible to provide a service so as to allow the said satellites to provide this service for a longer period for one and the same quantity of fuel loaded on board a satellite.

According to one aspect of the invention, a method is proposed for controlling a set of at least two satellites adapted to provide a service used by at least one portion of the set of the said satellites at a given moment, in which, continuously or pseudo-continuously, a mean value of the longitudes of the respective ascending nodes of each satellite is computed, and, for each satellite, a correction of trajectory of the satellite is controlled by regulation of the longitude of the ascending node on a setpoint equal to the said current mean value.

Hence, the satellites are not kept on their respective orbits, but they are allowed to drift while maintaining the longitude of the ascending node of each, on a setpoint equal to the current mean value of the longitudes of the respective ascending nodes of each satellite.

Thus, the consumption of fuel for each satellite is greatly reduced compared with keeping the set of satellites on their respective initial orbits, while maintaining the service rendered.

The proposed method consists in alleviating the "fuel" constraint in the case of a fleet or a constellation of satellites by allowing certain of the individual orbital parameters of each satellite to drift because the simultaneous presence of several satellites makes it possible to relay the service to be provided even in the event of a change in the orbital parameters, solely provided that each satellite is controlled around the overall mean secular drift of the fleet of satellites.

The longitude of the ascending nodes is defined in the description of FIG. 1.

According to one embodiment, the longitude of the ascending node of the said satellites is measured, respectively when a satellite is in view from its ground control station.

Thus, this measurement necessary to the computation of the setpoint is available in the very location from which the remote controls fixing the setpoint will depart to the satellite.

In one embodiment, the ground control stations are connected by a communication network.

Thus, the satellites can be controlled by geographically distinct stations, because the fact that they are linked by a communication network allows each one to have all the longitude measurements of the ascending nodes necessary to the computation of its mean value.

According to one embodiment, a single earth control station is used for the set of the said satellites.

Thus, it is no longer necessary to transfer ascending-node longitude values and this single station can directly carry out the computation of the mean value.

In one embodiment, a control for correcting the trajectory of a satellite, when the said satellite participates in the provision of the said service, may be deferred to a moment when the satellite no longer participates in the provision of the said service.

Thus, the operational availability of the satellite is increased, because the trajectory corrections that usually lead to an unavailability of the service (for example because of a misalignment due to the orientation of a jet for correcting the speed, etc.) take place at a moment when the service is not used on this satellite.

According to one embodiment, the computations and controls are carried out autonomously by the set of satellites, the latter optionally being able to communicate with one another in order to broadcast the values of their ascending node longitudes that are necessary for the computation of the said mean value.

Also proposed, according to another aspect of the invention, is a system for controlling a set of at least two satellites adapted to provide a service used by at least one portion of the set of the said satellites at a given moment, comprising means for computing, continuously or pseudo-continuously, a mean value of the right ascensions of the respective ascending node of each satellite, and means for controlling, for each satellite, a trajectory correction of the satellite by regulation of the right ascension of the ascending node on a setpoint equal to the said current mean value.

In all of the foregoing, the term "pseudo-continuous" means that the change in the monitored parameter (the right ascension of the ascending node) is slow in comparison with the orbital period of the satellites: in other words, in order to compute the mean of these parameters for several satellites, it is not necessary to have an absolutely simultaneous measurement taken at the same time. For instance measurements that are spread during an orbit are perfectly usable. It is therefore possible to be satisfied, in order to obtain the mean value, with using the mean of the measurements taken at different moments for each satellite in the course of one and the same day, simply by taking these measurements when the said satellites come into view of their respective station(s). It is this process of computing the mean value from measurements that are not exactly simultaneous that is called "pseudo-continuous".

BRIEF DESCRIPTION OF THE DRAWINGS

The invention will be better understood on studying a number of embodiments described as non-limiting examples and illustrated by the appended drawings in which.

In the various figures, the elements that have identical references are similar.

DETAILED DESCRIPTION

Figure 1:
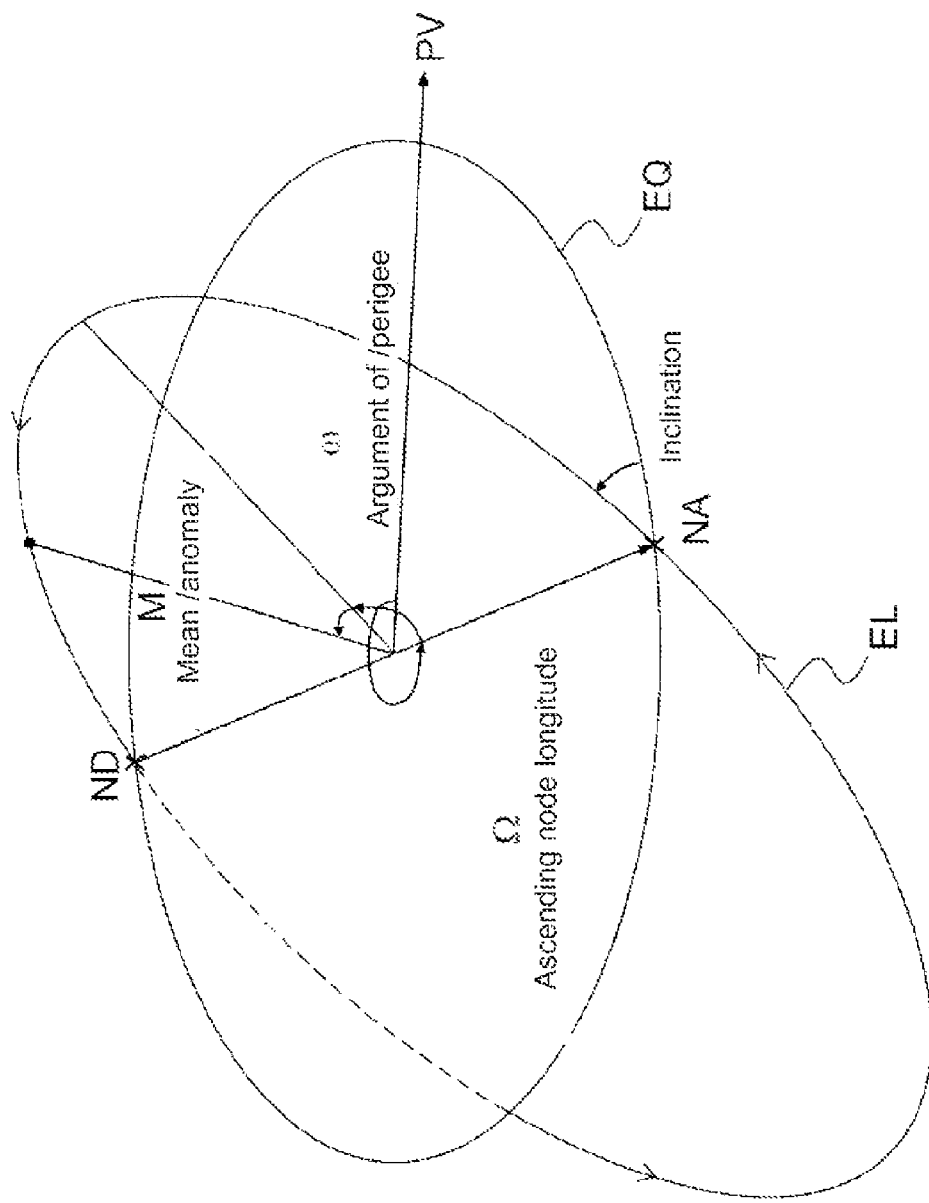
FIG. 1 illustrates schematically the physical parameters used.

In FIG. 1, the conventional variables used for defining satellite orbits are shown.

An elliptical orbit EL of a satellite can be defined in space according to six parameters making it possible to compute the complete trajectory very precisely. Two of these parameters, i.e. the eccentricity and the semi-major axis, define the trajectory in one plane, three other parameters, i.e. the inclination i, the longitude $\Omega_{NA}$ of the ascending node NA, and the argument $\omega$ of the perihelion define the orientation of the plane in space, and the last, i.e. the time of perihelion passage defines the position of the satellite.

The semi-major axis a is half of the distance that separates the perigee from the apogee. This parameter defines the absolute size of the elliptical or circular orbit.

The eccentricity e of an ellipse measures the distance of the foci relative to the centre of the ellipse, that is to say the ratio of the distance between the centre and one focus and the semi-major axis. The trajectory being elliptical, this gives $0<e<1$.

The inclination i is the angle that the orbital plane makes with a reference plane, in this instance the plane of the equator EQ.

The longitude $\Omega_{NA}$ of the ascending node NA is the angle between the direction of the vernal point PV and the line of the nodes connecting the ascending node NA and the descending node ND, in the plane of the equator. The direction of the vernal point PV is the straight line containing the sun and the vernal point PV (the astronomical reference point corresponding to the position of the sun at the time of the spring equinox). The line of the nodes is the straight line to which the ascending node (the point of the orbit at which the object passes to the north of the equator) and the descending node (the point of the orbit at which the object passes to the south of the equator) belong.

The argument of the perigee $\omega$ is the angle formed by the line of the nodes and the direction of the perigee (the straight line to which the planet (or the central object) and the perigee of the trajectory of the object belong), in the orbital plane. The longitude $\Omega_p$ of the perigee is the total of the longitude $\Omega_{NA}$ of the ascending node NA and of the argument of the perigee.

Figure 2:
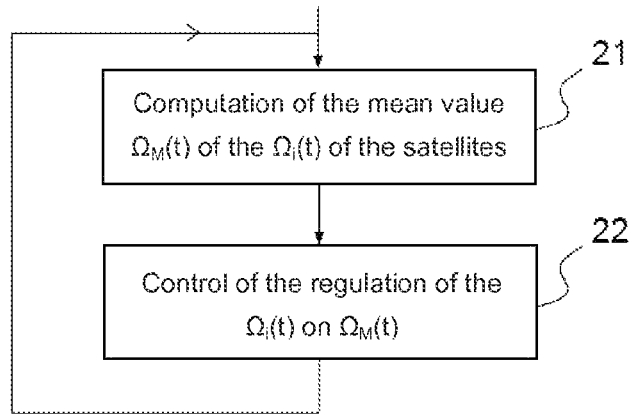
FIG. 2 illustrates schematically the steps of the method according to one aspect of the invention.

FIG. 2 illustrates schematically the steps of the method for controlling a set of at least two satellites adapted to provide a service used by at least one portion of the set of the said satellites at a given moment, according to one aspect of the invention.

Continuously or pseudo-continuously, a mean value $\Omega_M(t)$ is computed (step 21) of the longitudes of the respective ascending nodes $\Omega_i(t)$ of each satellite of index i, and for each satellite, a correction of the trajectory of the satellite is applied (step 22) by regulation of the longitude of the ascending node $\Omega_i(t)$ on a setpoint equal to the said current mean value $\Omega_M(t)$.

The longitude of the ascending node $\Omega_i(t)$ of the said satellites is measured respectively when a satellite is in view of its ground control station.

It is possible to link the ground control stations by a communication network. It is possible to use a single ground control station for the set of the said satellites.

A correction of the trajectory of a satellite that is scheduled when the satellite participates in the provision of the service can be deferred at a moment when the satellite no longer participates in the provision of the said service. Thus, the provision of the service is not disrupted.

As a variant, the computations and controls may be carried out autonomously by the set of satellites, and not require a ground station.

Figure 3:
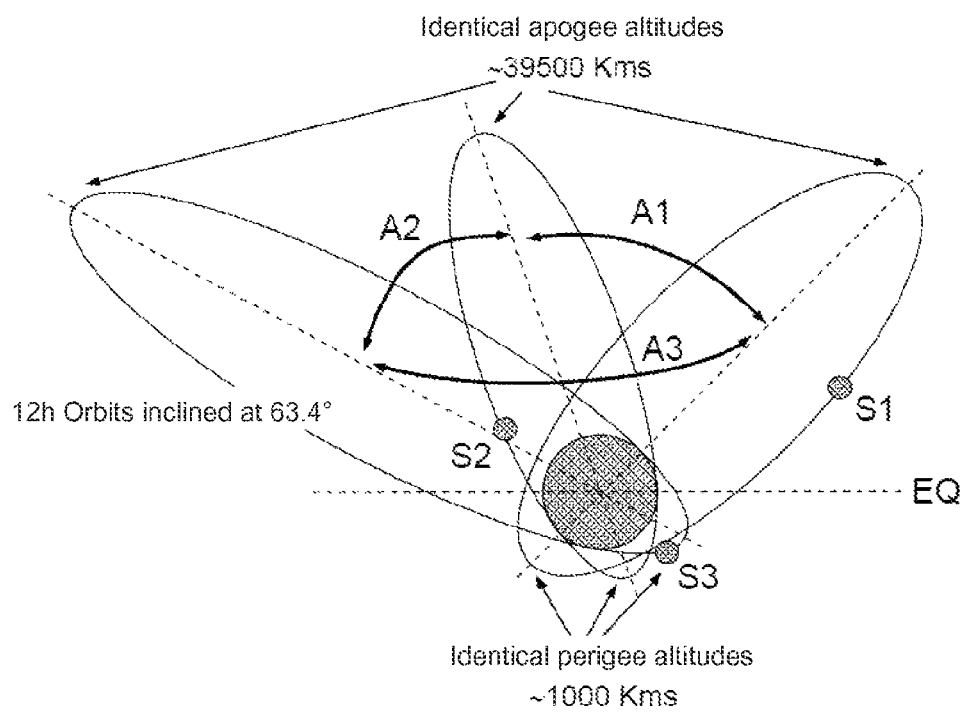
FIG. 3 illustrates an example of a controlled system according to one aspect of the invention.

FIG. 3 shows an example for a constellation with three satellites S1, S2 and S3 on three orbital planes separated by angles of 120°, for a service life of the constellation of fifteen years, with a control relating to the right ascension of the ascending node $\Omega_i(t)$, that is to say that the station-keeping corrects only the divergences relative to the common portion or mean $\Omega_M(t)$ of the movement for the whole of the constellation, the common portion or mean of the movement not being corrected.

This station-keeping strategy makes it possible to substantially reduce the annular average cost of station-keeping. In this example, the cost is reduced from 150 to 180 m/s per year to only 15 to 30 m/s per year.

The savings in fuel (consumable) thus achieved directly result in an increase in the potential service lifetime for the satellite, which means that it is possible either to design a lighter satellite (with less fuel) for the same service lifetime, or to obtain a longer service lifetime by applying the invention to satellites that already exist or are even already launched.

In the case of a fleet of existing satellites, the invention results in the modification of the procedures for station-keeping of satellites, culminating for example in distinct timing diagrams of manoeuvres, providing for different manoeuvres at different moments, which result on average in reduced fuel consumptions.

The invention claimed is:

1. A method for controlling a set of at least two satellites configured to provide a service used by at least one portion of the set of said satellites at a given moment, the method comprising:
  computing, continuously or pseudo-continuously, a mean value of longitudes of respective ascending nodes of each satellite; and
  controlling, for each satellite, a correction of trajectory of the satellite by regulating a longitude of an ascending node on a setpoint equal to said mean value.

2. The method according to claim 1, wherein the longitude of the ascending node of each satellite is measured, respectively, when the satellite is visible from a ground control station.

3. The method according to claim 2, wherein the ground control station is connected to other ground control stations via a communication network.

4. The method according to claim 1, wherein a single ground control station is used for the set of the said satellites.

5. The method according to claim 1, wherein controlling the correction of the trajectory of the satellite is deferred to a moment when the satellite no longer participates in provision of said service.

6. The method according to claim 1, wherein the computing and controlling are carried out autonomously by the set of satellites, the controlling being configured to communicate to broadcast values of the ascending node longitudes necessary for the computing of said mean value.

7. A system for controlling a set of at least two satellites configured to provide a service used by at least one portion of the set of said satellites at a given moment, the system being configured to:
  compute, continuously or pseudo-continuously, a mean value of longitudes of respective ascending nodes of each satellite; and
  control, for each satellite, a trajectory correction of the satellite by regulation of a longitude of an ascending node on a setpoint equal to said mean value.

* * * * *